(12) United States Patent
Chuhadar et al.

(10) Patent No.: US 10,938,770 B2
(45) Date of Patent: Mar. 2, 2021

(54) BULK EMAIL TRACKING AND CEASING PROCESSING

(71) Applicant: Oracle International Corporation, Redwood Shores, CA (US)

(72) Inventors: Bura Chuhadar, NW Washington, DC (US); Jeffrey James Rothe, Indianapolis, IN (US); Eric Sutton, Redwood City, CA (US); Allison Burnett, Toronto (CA)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 16/560,387

(22) Filed: Sep. 4, 2019

(65) Prior Publication Data
US 2020/0127962 A1 Apr. 23, 2020

Related U.S. Application Data

(60) Provisional application No. 62/748,416, filed on Oct. 20, 2018.

(51) Int. Cl.
*H04L 12/58* (2006.01)
*G06Q 20/10* (2012.01)
*G06F 3/0482* (2013.01)

(52) U.S. Cl.
CPC ............ *H04L 51/34* (2013.01); *G06F 3/0482* (2013.01); *G06Q 20/10* (2013.01)

(58) Field of Classification Search
CPC ........ H04L 51/34; G06F 3/0482; G06Q 20/10
See application file for complete search history.

(56) References Cited

U.S. PATENT DOCUMENTS

| | | | |
|---|---|---|---|
| 9,824,377 B1* | 11/2017 | Wheeler | H04L 63/308 |
| 9,886,700 B1* | 2/2018 | Allouche | G06Q 30/0251 |
| 2005/0010644 A1* | 1/2005 | Brown | H04L 51/30 709/206 |
| 2008/0098075 A1* | 4/2008 | O'Bryan | G06Q 30/02 709/206 |
| 2008/0126495 A1* | 5/2008 | Lynn | H04L 12/1859 709/206 |
| 2011/0246267 A1* | 10/2011 | Williams | G06Q 30/08 705/14.4 |
| 2012/0109741 A1* | 5/2012 | Ballapragada | G06Q 30/0244 705/14.43 |

(Continued)

*Primary Examiner* — Blake J Rubin
(74) *Attorney, Agent, or Firm* — Tarolli, Sundheim, Covell & Tummino LLP

(57) ABSTRACT

A computer implemented method for tracking bulk email can include configuring, by a bulk email client, a bulk email, wherein the bulk email includes an initial email and identifies a plurality of recipients. The method can further include iteratively executing by the bulk email client after the configuring, a sub-method until either a marked email corresponding to the bulk email is prepared for each recipient in the plurality of recipients or a request to cease continuation of processing the bulk email is generated in response to user input at the bulk email client. The bulk email client displays a graphical user interface that shows a selectable interruption element that, if selected, terminates or pauses prior to completion of a current or next iteration.

20 Claims, 10 Drawing Sheets

(56) References Cited

U.S. PATENT DOCUMENTS

| | | | |
|---|---|---|---|
| 2012/0191546 A1* | 7/2012 | Phelan | G06Q 10/107 |
| | | | 705/14.67 |
| 2012/0290399 A1* | 11/2012 | England | G06Q 50/01 |
| | | | 705/14.66 |
| 2014/0108572 A1* | 4/2014 | Borzilleri | H04L 51/34 |
| | | | 709/206 |
| 2014/0236663 A1* | 8/2014 | Smith | G06Q 10/0633 |
| | | | 705/7.27 |
| 2014/0279016 A1* | 9/2014 | Capel | G06Q 30/0261 |
| | | | 705/14.58 |
| 2015/0106928 A1* | 4/2015 | Steinmann | H04L 63/145 |
| | | | 726/23 |
| 2015/0134446 A1* | 5/2015 | Castelli | G06Q 30/0251 |
| | | | 705/14.49 |
| 2015/0154632 A1* | 6/2015 | Jindal | G06Q 30/0246 |
| | | | 705/14.45 |
| 2016/0210644 A1* | 7/2016 | Brewer | G06Q 30/0203 |
| 2018/0026926 A1* | 1/2018 | Nigam | H04L 51/08 |
| | | | 709/206 |
| 2018/0219818 A1* | 8/2018 | Kramer | H04L 51/28 |
| 2019/0044902 A1* | 2/2019 | Teplow | G06Q 10/06 |

* cited by examiner

BULK EMAIL TRACKING AND CEASING PROCESSING

CROSS-REFERENCE TO RELATED APPLICATION

This application claims the benefit of priority to U.S. Provisional Application No. 62/748,416 filed on 20 Oct. 2019, the entirety of which is herein incorporated by reference.

TECHNICAL FIELD

This disclosure relates to emails. More particularly, this disclosure relates to systems and methods for tracking a bulk email and ceasing processing of the bulk email after processing of the bulk email has been initiated.

BACKGROUND

A tracking pixel is one of various techniques used on web pages or email, to unobtrusively (usually invisibly) allow checking that a user has accessed some content. Common uses are email tracking and page tagging for web analytics. Alternative names are web beacon, web bug, tracking bug, tag, or page tag, tracking pixel, pixel tag, 1×1 gif, and clear gif. When implemented using JavaScript, a tracking pixel may be called a JavaScript tag.

Bulk email software is software that is used to send emails in large quantities. Most bulk email software programs are hosted by third party companies that sell access to a system for generating/sending bulk emails. Some bulk email software programs are hosted by end-user devices (e.g., desktop or laptop computers).

Attempts to monitor email when emails are opened are described in U.S. Pat. No. 7,072,947 filed on Nov. 6, 2002, U.S. Pat. No. 7,076,533 filed on Nov. 6, 2002, and U.S. Pat. No. 7,680,892 filed Sep. 11, 2006, the entirety of each is herein incorporated by reference.

SUMMARY

Figure 1:
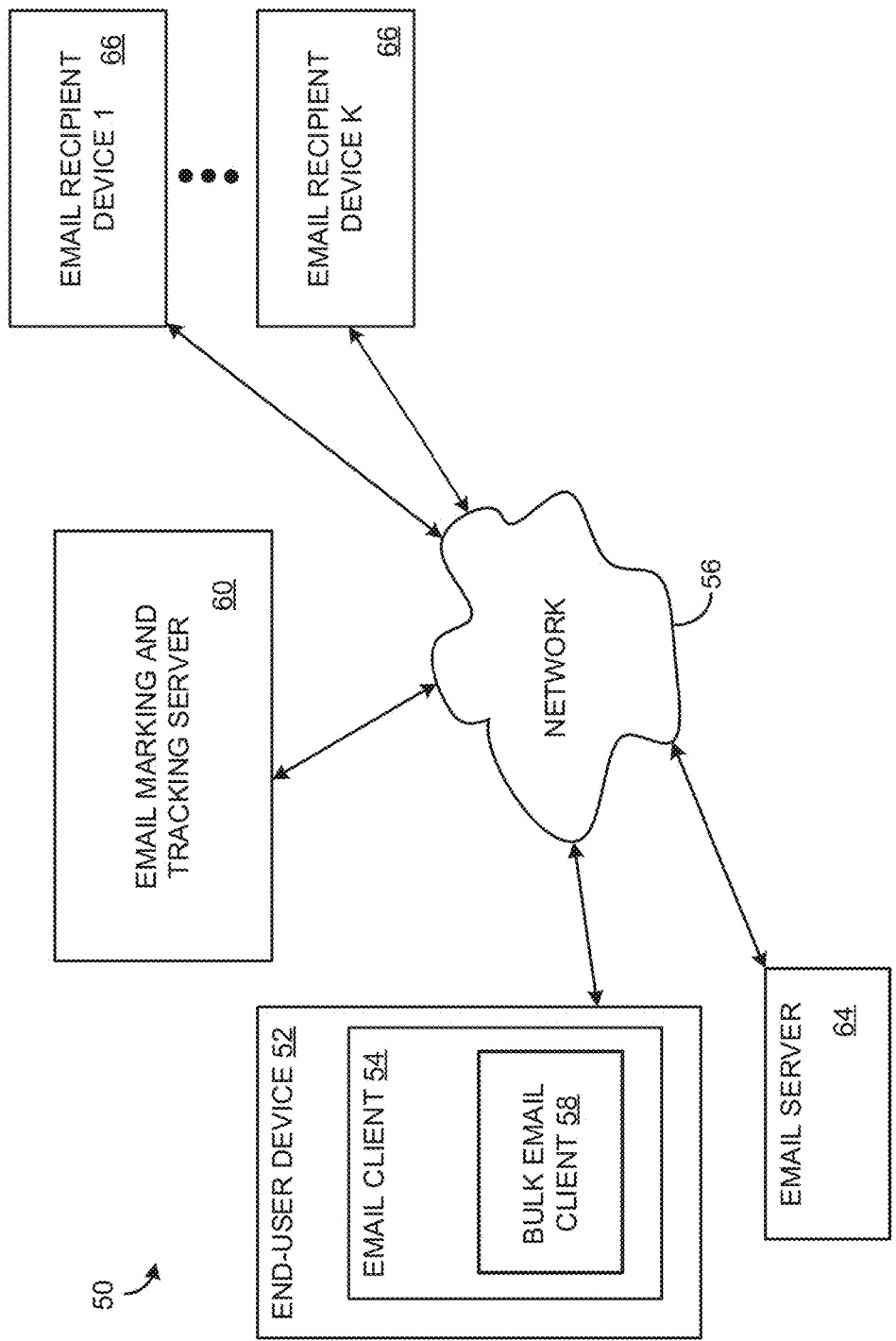
FIG. 1 illustrates an example of a system for generating and tracking processing of a bulk email.

One example relates to method for tracking bulk email that includes configuring a bulk email by a bulk email client, wherein the bulk email includes an initial email and identifies a plurality of recipients. The method further includes iteratively executing a sub-method until either a marked email corresponding to the bulk email is prepared for each recipient in the plurality of recipients or a request to cease continuation of processing the bulk email is generated in response to user input at the bulk email client by the bulk email client after the configuring. The bulk email client displays a graphical user interface that shows a selectable interruption element that, if selected, terminates or pauses prior to completion of a current or next iteration of the sub-method in response to the selection. The sub-method includes sending, from the bulk email client, an unmarked email to an email marking server, wherein the unmarked email is based on a copy of the initial email and a current recipient of a plurality of recipients.

The sub-method further includes receiving, at the bulk email client, a marked email from the email marking server, wherein the marked email includes a marking, wherein the marking is tied to a specific record on the email marking server that uniquely identifies the current recipient, via an identifier. The marking triggers a network communication to the email marking server when the current recipient interacts with the marked email, such that the email marking server is configured to identify the current recipient as having interacted with the marked email when the marking triggers the network communication to the marking server. Furthermore, the sub-method includes generating, at the bulk email client, a graphical indication in the graphical user interface that the marked email has been prepared, wherein the marking includes a tracking pixel.

Another example relates to a method for tracking bulk email that includes configuring parameters of bulk email by a bulk email user interface (UI), wherein the parameters include an initial email and a plurality of recipients. The method further includes a sub-method that iteratively executes, by the bulk email client after the configuring, until either each recipient of the plurality of recipients is prepared a marked email corresponding to the bulk email or a request to cease continuation of processing the bulk email is generated in response to user input at the bulk email UI. The bulk email UI displays a selectable interruption element that, if selected, terminates or pauses prior to completion of a current or next iteration of the sub-method in response to the selection. The sub-method includes sending, from the bulk email API, an unmarked email to the email marking server, wherein the unmarked email is based on a copy of the initial email and a current recipient of a plurality of recipients.

The sub-method further includes receiving, at the bulk email API, a marked email from the email marking server, wherein the marked email includes a marking, wherein the marking is tied to a specific record on the email marking server that uniquely identifies the current recipient, via an identifier. The marking triggers a network communication to the email marking server when the current recipient interacts with the marked email, such that the email marking server is configured to identify the current recipient as having interacted with the marked email when the marking triggers the network communication to the marking server. The sub-method further includes outputting, at the bulk email UI, a graphical indication that the marked email has been prepared, wherein the marking includes a tracking pixel.

Yet another example relates to a non-transitory computer-readable storage medium storing a computer readable program that causes the program to configure a bulk email by a bulk email client, wherein the bulk email includes an initial email and identifies a plurality of recipients. After the configuration, a sub-method is iteratively executed by the bulk email client until either a marked email corresponding to the bulk email is prepared for each recipient in the plurality of recipients or a request to cease continuation of processing the bulk email is generated in response to user input at the bulk email client. The bulk email client displays a graphical user interface that shows a selectable interruption element that, if selected, terminates or pauses prior to completion of a current or next iteration of the sub-method in response to the selection. The sub-method includes sending, from the bulk email client, an unmarked email to an email marking server, wherein the unmarked email is based on a copy of the initial email and a current recipient of a plurality of recipients.

At the bulk email client, a marked email is received from the email marking server, wherein the marked email includes a marking wherein the marking is tied to a specific record on the email marking serve that uniquely identifies the current recipient, via an identifier. The marking triggers a network communication to the email marking server when the current recipient interacts with the marked email, such that the email marking server is configured to identify the current recipient as having interacted with the marked email when the marking triggers the network communication to the marking server. The sub-method further includes generating, at the bulk email client, a graphical indication in the graphical user interface that the marked email has been prepared, wherein the marking includes a tracking pixel.

DETAILED DESCRIPTION

This disclosure relates to systems and methods for tracking bulk email that can be ceased (paused or canceled) after initiation. A bulk email client can configure a bulk email that includes (at least) an initial email and a list of recipients. Moreover, the bulk email client can enable actuation of a request to cease continuation of processing the bulk email (e.g., a "cancel" button).

To process the bulk email, a sub-method is iteratively executed by the bulk email client and the email marking and tracking server for each of the plurality of participants until either each recipient of the plurality of recipients has a marked email corresponding to the bulk email prepared or a request to cease continuation of processing the bulk email is generated (e.g., in response to user input). In response to such a request, the bulk email client can terminate or pause further processing of the bulk email. That is, after requesting to cease continuation of processing the bulk email, no new marked emails for the bulk email are prepared or sent, optionally before or after the currently processed email is sent. In fact, the request to cease continuation of processing of the bulk email can stop a next iteration of the sub-method from processing, cancel a current iteration of the sub-method, and (in some examples) roll back a previous iteration if an email generated in a previous iteration has not left an email client outbox.

During each iteration of the sub-method, an individualized email that includes a tracking pixel embedded therein (e.g., a marked email) is generated and prepared for (e.g., individualized) each recipient of the bulk email. Moreover, during operations of such generation and sending, notifications are provided to the user at the bulk email client informing the user as to the current progress and status of the bulk email. Moreover, since each email in the bulk is processed individually, the user may desire to actuate the request to cease continuation of processing of the bulk email in a less than all-or-nothing manner.

FIG. 1 illustrates an example of a system 50 configured to facilitate the generation and tracking of bulk emails. As used herein, the term "bulk email" refers to an email generated for a plurality of recipients. In some examples, there can be as few as two recipients of a bulk email. Conversely, in some situations there may be thousands or even millions of recipients of the bulk email.

The system 50 can include an end-user device 52. The end-user device 52 can be implemented as a computing platform. Accordingly, the end-user device 52 can be implemented as a general purpose computing device, such as a desktop computer, a laptop computer, a mobile device (e.g., a smartphone, a tablet computer), etc. The end-user device 52 can include an email client 54 executing thereon. The email client 54 can be implemented as a software application (e.g., an "app") for generating and reading emails that are transmitted over a network 56 (e.g., the Internet). In some examples, the email client 54 can be implemented as MICROSOFT OUTLOOK®. In other examples, the email client 54 can be implemented as GMAIL® or YAHOO MAIL® (e.g., a web-based application, in which case an email web server may perform some of the functionality and a browser email web client may perform some other functionality towards sending an email).

The email client 54 can include a bulk email client 58 executing as a plugin on the email client 54. It is noted that in other examples, the bulk email client 58 can operate as a stand-alone application. The bulk email client 58 can be employed by a user (e.g., end-user) of the end-user device 52 to operate in concert with an email marking and tracking server 60 to configure and track a bulk email intended for a plurality of recipients. The email marking and tracking server 60 can also be referred to as an email marking server, and the email marking server may or may not be responsible for implementing the tracking functionality after the email has been sent, but rather just for marking an email for tracking.

The email marking and tracking server 60 can be representative of a computing platform. Thus, the email marking and tracking server 60 (and other computing platforms described herein) can include a memory that can store machine readable instructions. The memory could be implemented, for example, as non-transitory computer readable media, such as volatile memory (e.g., random access memory), nonvolatile memory (e.g., a hard disk drive, a solid-state drive, flash memory, etc.) or a combination thereof. The email marking and tracking server 60 can also include a processing unit to access the memory and execute the machine-readable instructions. The processing unit can include, for example, one or more processor cores. The email marking and tracking server 60 can be configured to communicate with the network 56. The email marking and tracking server 60 (along with other computing platforms described herein) could be implemented in a computing cloud. In such a situation, features of the email marking and tracking server 60, such as the processing unit and the memory could be representative of a single instance of hardware or multiple instances of hardware with applications executing across the multiple of instances (i.e., distributed) of hardware (e.g., computers, routers, memory, processors, or a combination thereof). Alternatively, the email marking and tracking server 60 can be implemented on a single dedicated server. The email marking and tracking server 60 can be configured to mark emails for the bulk email with a tracking pixel and to track which recipients of the plurality of recipients have had a marked email prepared.

The bulk email client 58 can provide a bulk email user interface (UI). The bulk email UI can be a graphical user interface (GUI) that is integrated with a UI of the email client 54. In one example, to initiate a bulk email the user of the end-user device 52 can employ the bulk email UI to configure a bulk email, including setting parameters for the bulk email. Such parameters can include, but are not limited to any one or more of a list of recipients of the bulk email, content for the bulk email (e.g., an initial email), an amount of time between sending a first email and a second email in the bulk email and an amount of time between sending subsequent emails (after the second email) in the bulk email and/or intended receipt time or any combination thereof. This list and any other and/or list is intended to disclose both disjunctive and conjunctive embodiments.

The bulk email client 58 can include a bulk email application programming interface (API) (or in some examples, a bulk email agent) that can send and receive messages from the email marking and tracking server 60. Upon configuring the bulk email, the bulk email client 58 (via the bulk email API) can send a requests for a marked email for the bulk email to the email marking and tracking server 60. Moreover, the bulk email client 58 can output a visual indicia (e.g., a progress bar and/or a counter) that characterizes an overall status of the bulk email.

The bulk email can be processed and sent in an interactive sub-method (a sub-process) that is repeated (looped) for each recipient of the bulk email. During execution of the sub-method, the bulk email client 58 can enable actuation of a request to cease of processing the bulk email. The request to cease processing the bulk email can be implemented, for example, as a cancellation or pause request. As one example, the request to cease processing the bulk email (referred hereinafter as "cease processing operation") can be actuated with the selection of a selectable interruption element. Such selection can be implemented as the pressing of a virtual button in the bulk email UI. At any point after the cease processing operation is enabled until the bulk email is fully processed, the cease processing operation can be actuated. Actuation of the cease processing operation of the bulk email causes the currently executing iteration (or currently executing multiple parallel iterations) of the sub-method to pause or terminate prior to completion of the iteration of the sub-method. In fact in some examples, actuation of the cease processing operation can cause the could stop the next iteration from proceeding, cancel the current marking iteration and/or even roll back the previous marking iteration as long as the email prepared in the previous iteration has not left an outbox of the email client 54. As an example of such a roll back, the bulk email client may prevent a marked email prepared in the previous iteration from being sent to a corresponding recipient. In this manner, the cease processing operation can be actuated in response to observations by the user such that the bulk email can be processed in other than an all-or-nothing manner as described herein.

During the sub-method the, bulk email client 58 can determine a next recipient for the bulk email. As used herein, the term "next recipient" refers to a recipient of the plurality of recipients for which a marked (and individualized) email is generated in a current iteration of the sub-method, such that the "next recipient" can alternatively be referred to as a "current recipient". Such a determination can include prioritizing the list of recipients in the bulk email configuration. As some examples, the recipients can be prioritized based on a predicted location (e.g., a street address) associated with a record stored in a database for each recipient (or some subset thereof) and a time. As one example, if the bulk email configuration has an intended receipt time of 2:00 p.m., and the bulk email client 58 has a current time of 11:00 a.m. Pacific Time of the United States, the bulk email client 58 can sort the list of recipients such that those recipients expected to be in the Eastern Time Zone of the United States are processed first and that recipients expected to be in the Central Time Zone of the United States are processed about one hour later (near 12:00 p.m. Pacific Time).

Continuing with the sub-method, the bulk email client 58 can execute a merge mail operation that inserts content (e.g., the initial email) associated with the next recipient along with an email address of the next recipient to generate an unmarked (individualized) email corresponding to the bulk email for the next recipient. In some examples, during each iteration of the sub-method, different content can be added to generate different individualized emails for the bulk email. As one example, the content for the bulk email may be implemented with a template with fields that can be customized to each recipient of the bulk email. For instance, the content may include a field for a name of each recipient in the list of recipients. In such a situation, the bulk email client 58 can populate the field with the name of the next recipient. Similarly, the fields may include an organizational name. In this manner, a first subset of the recipients may be generated a different individualized email for the bulk email than a second subset of the recipients.

The bulk email client 58 can provide the unmarked email to the email marking and tracking server 60. In response, the email marking and tracking server 60 can generate a tracking pixel and associate the tracking pixel with a unique identifier for the next recipient. The tracking pixel can be tied to a specific record of a database (or other data structure) that uniquely identifies the next recipient. The database may be cloud hosted, local to the email marking and tracking server 60, or otherwise accessible to the email marking and tracking server 60 so that the status of individualized emails can be determined. Further, the tracking pixel can be implemented as marking that triggers a network communication (e.g., through the network 56) to the email marking and tracking server 60 when the next recipient interacts with the marked email. Moreover, the marking and tracking server 60 is configured to identify the next recipient as having interacted with the marked email when the marking triggers the network communication to the marking server. As one example, if the next recipient has an email address of "somebody@example.com" the tracking pixel can be an embedded image of a Uniform Resource Locator (URL) http://example.com/track.gif?somebody@example.org. The email marking and tracking server 60 can insert the tracking pixel into the unmarked email for the next recipient to finalize generation of the marked (and individualized) email for the next recipient of the bulk email.

Continuing with the sub-method, a notification of a marked email has been prepared for the next recipient can be provided to the bulk email client 58 (e.g., at the bulk email API). In some examples, in response, the bulk email UI of the bulk email client 58 can update the visual indicia characterizing the overall status (e.g., advance the progress bar) of processing of the bulk email. Additionally, in some examples, the update to the status can include displaying information characterizing the marked (and individualized) email for the next recipient. Such information can include, for example a name and/or email address of the next recipient as well as content of the marked email.

In some situations, the user of the bulk email client 58 may desire to actuate the cease processing operation in response to the notification. For instance, if the user has a-priori knowledge that the (current) next recipient should not have been included in the list of the plurality of recipients for the bulk, the it may be desirable to pause or cancel further processing of the bulk email such that the (previously) prepared marked email for the next recipient is not sent to the next recipient. If the cease processing operation is actuated, the bulk email client 58 bulk email client 58 pauses or terminates further processing of the bulk email. If the cease processing operation is only a pause, at some point in the future the user can de-actuate the cease processing operation, and the bulk email client 58 can resume processing of the bulk email. To ensure that the user is provided sufficient time to actuate the cease processing operation (if desired), in some examples where the bulk email client 58 receives the marked email, the bulk email client 58 can hold the marked email for a predetermined amount of time based on the parameters of the bulk email. For example, if the next recipient is the first recipient, the parameters of the bulk email may dictate that the predetermined time is longer (or shorter) than the predetermined time for subsequent recipients. In another embodiment, the delay or an additional delay can be added before or after marking the email at the marking and tracking server 60.

Assuming that the cease processing operation has not been actuated, the sub-method continues, and the marked email for the next recipient of the bulk email is sent to the next recipient. In some examples, to send the marked email to the next recipient, the marked email for the next recipient is provided from the email marking and tracking server 60 to the bulk email client 58 (via the bulk email API). In such a situation, the bulk email client 58 can output the marked email for the next recipient with the bulk email UI. Additionally, the bulk email client 58 can mark the next recipient as having been sent the bulk email. At this point, the user of the bulk email client 58 may desire to actuate the cease processing operation in response to the notification. For instance, if the user sees that the marked email for next recipient has an error (e.g., a typographical errors and/or formatting error), it may be desirable to pause or cancel further processing of the bulk email such that the marked email prepared for the next recipient is not sent. In some examples, to allow the user time to decide, the bulk email client 58 may hold the marked email (with a delay operation) for a predetermined amount of time based on the parameters of the bulk email. After the predetermined amount of time, if any, the marked email for the next recipient can be sent to an outbox of the email client 54. In this situation, the email client 54 can forward the marked (and individualized) email for the next recipient to an email server 64, such as a Simple Mail Transfer Protocol (SMTP) server or a MICROSOFT EXCHANGE® server. In other examples, the email marking and tracking server 60 can send the marked email to the email server 64 without sending the marked email to the bulk email client 58.

Continuing with the sub-method, the email server 64 routes the marked email to a mailbox for the next recipient. Moreover, at some point in the future, the next recipient can employ one of K number of email recipient devices 66 to retrieve and open (or otherwise interact with) the marked email for the bulk email, where K is an integer greater than or equal to two. For purposes of simplification of explanation, it is presumed that K is equal to the number of recipients of the bulk email. Each of the K number of email recipient devices 66 can be implemented as a computing platform, such as a desktop computer, a laptop computer, a mobile computing device (e.g., a smartphone or a tablet computer, etc.).

Upon opening the marked email, the data (e.g., an image) at a URL included in the tracking pixel is requested via the network 56. As noted, the URL of the tracking pixel could be "http://example.com/ track.gif?somebody@example.org". For purposes of simplification of explanation, it is presumed that the URL points to the email marking and tracking server 60. Thus, opening (or otherwise interacting with) the marked email causes the email recipient device 66 of the next recipient to provide a request for data ("track.gif") for the marked email. In such a situation, the email marking and tracking server 60 sends the requested data ("track.gif") to the email recipient device 66 of the next recipient. Additionally, the email marking and tracking server 60 can register the marked email as having been interacted with by the next recipient.

In some examples, the marked email can include interactive features that allow the next recipient to generate a response to the marked email for the bulk email. For instance, the marked email can include an option to "unsubscribe" to future bulk emails. Additionally or alternatively, the marked email can include an interactive feature (e.g., radio buttons or a text field) that allows the next recipient to provide feedback characterizing a perceived quality of the marked email for the bulk email. Such email response can be provided to the email marking and tracking server 60.

The email marking and tracking server 60 can categorize the response to the marked email for the bulk email. Such categories can be positive, neutral and negative. For instance, a response corresponding to an "unsubscribe" option can be categorized as negative. Conversely, a response indicating that the next recipient perceived the marked email as being high quality can be categorized as positive. The email marking and tracking server 60 can provide a notification of the email response (including the category) to the bulk email client 58 via the bulk email API.

The bulk email client 58 can output information characterizing the email response (including the category) at the bulk email UI. At this point, the user of the bulk email client 58 may desire to actuate the cease processing operation in response to the notification. For example, (through multiple iterations of the sub-method), if multiple recipients have provided negative feedback, the user may desire to actuate the cease processing operation to avoid subsequent negative feedback. To provide the user time to process the information characterizing the email response, the bulk email client 58 may delay further operations for a predetermined amount of time based on the parameters of the bulk email.

Assuming that the cease processing operation has not been actuated the sub-method iteration completes and a next iteration is executed and a subsequent marked email is prepare for a subsequent recipient in the plurality of recipients. It is noted that multiple iterations of the sub-method can execute contemporaneously. As an example, for a wide distribution bulk email (e.g., 20 or more recipients) it is very unlikely that each recipient will open a corresponding marked email for the bulk email in the order in which the email was sent. Accordingly, there is no need for the email marking and tracking server 60 to wait on a receipt of a notification that a given recipient has opened an email or provided a response prior to preparing a subsequent marked email. In fact, it is very unlikely that in such a mass bulk email that every recipient will even open the corresponding marked email, and it is even less likely that every recipient is the plurality of recipients will provide a response. Thus, the processing of the bulk email is completed after each recipient of the bulk email is prepared a corresponding marked email independent of whether each (or any) recipient opens a corresponding marked email or provides an email response.

In some examples, the email marking and tracking server 60 can debit a fee to an account associated with the bulk email client 58 for marking the emails for the bulk email. In some examples, if the bulk email is terminated before each of the recipients have a marked email prepared (e.g., in response to actuation of the cease processing operation), the email marking and tracking server 60 may prorate the fee based on the number of marked emails for the bulk email that have been generated prior to the termination. In other examples, the email marking and tracking server 60 may charge the full fee for the bulk email independent of when/if the processing of the bulk email is terminated.

By employing the system 50, even after the process of sending the bulk email has been initiated, the user of the end-user device 52 can still actuate the cease processing operation to pause or terminate further processing of the bulk email prior to completion of such processing. Additionally, the bulk email client 58 and/or the email marking and tracking server 60 can add delay operations to ensure that the user of the end-user device 52 is given time to react to different operations of each iteration of the sub-method. In this manner, harm (e.g., harm to reputation, financial harm, etc.) that would be caused by completing the sending of the bulk email to every recipient in the plurality of recipients can be mitigated.

Figure 2:
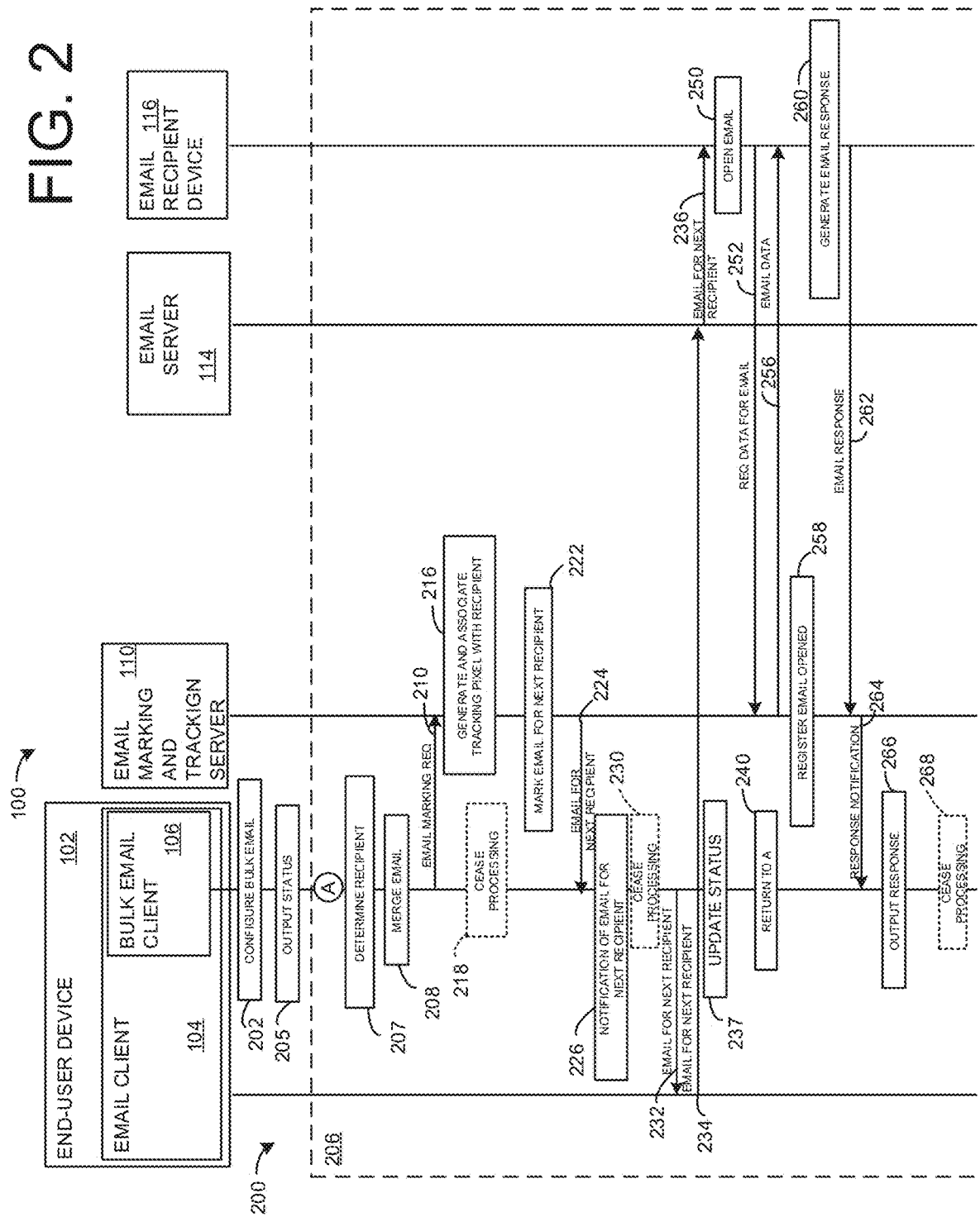
FIG. 2 illustrates a timing diagram for a system that generates and tracks processing of a bulk email.

FIG. 2 illustrates a timing diagram depicting an example of a timing of operations by a system 100 for executing a method 200 for processing a bulk email. The system 100 can be implemented similar to the system 50 of FIG. 1. Thus, the system 100 can include an end-user device 102 (e.g., a computing platform) with an email client 104 executing thereon. A bulk email client 106 (e.g., a plugin of the email client 104) can operate in concert with an email marking and tracking server 110 to process a bulk email.

At 202, a user of the bulk email client 106 can employ the bulk email UI to configure the bulk email, which can include setting parameters for the bulk email. Such parameters can include, but are not limited to any one or more of an initial email, a list of recipients of the bulk email, content for the bulk email, an amount of time between sending a first email and a second email in the bulk email and an amount of time between sending subsequent emails (after the second email) in the bulk email and/or intended receipt time or any combination thereof. At 205, the bulk email client 106 can output a visual indicia characterizing an overall status of the bulk email (e.g., a progress bar) to track the progress of the bulk email.

As indicated by node 'A', the email marking and tracking server 110 and the bulk email client 106 can process the bulk email in an iterative sub-method (a sub-process) that is repeated (looped) for each recipient of the bulk email. Prior to execution of the sub-method, the bulk email client 106 can enable actuation of a cease processing operation the bulk email. A cease window 206 (e.g., a cancelation window) of the method 200 identifies the portion of the method 200 during which processing of the bulk email can be ceased (paused or terminated) after the processing of the bulk email has been initiated through actuation of the cease processing operation.

Throughout the cease window 206, "cease processing" operations (depicted with dashed boxes) actuated at the bulk email client 106 to denote example times that the cease processing operation is actuated. The cease processing operation of the bulk email can be implemented, for example, as a cancellation or pause request. As one example, the cease processing operation can be actuated with pressing of a virtual button in the bulk email UI of the bulk email client 106. At any point after the cease processing operation is enabled, the cease processing operation can be actuated. Actuation of the cease processing operation during processing of the bulk email causes the iteration of the sub-method to pause or terminate prior to completion the iteration of the sub-method and prior to completion of any iteration of the sub-method that are operating in parallel. Actuation of the cease processing operation causes the bulk email client 106 to cease further operations that would otherwise continue the processing of the bulk email. As some examples, actuation of the cease processing operation can cause the bulk email client 106 to stop a next iteration from proceeding, cancel the current marking iteration, or even roll back the previous marking iteration as long as the email has not left the outbox of the email client 104. In this manner, the cease processing operation can be actuated in response to observations by the user such that the bulk email can be processed in other than an all-or-nothing manner.

During the sub-method, at 207 the bulk email client 106 can determine a next recipient for the bulk email. Such a determination can include prioritizing the list of recipients in the bulk email configuration. Upon determining the next recipient, at 208, the bulk email client 106 can execute a merge mail operation that inserts content associated with the next recipient along with an email address of the next recipient to generate an unmarked (individualized) email corresponding to the initial email of the bulk email for the next recipient. At 210, the bulk email client 106 can provide an email marking request to the email marking and tracking server 110 that includes the unmarked email. In some examples, during each iteration of the sub-method, different content can be added to generate different individualized email for the bulk email. At 216 email marking and tracking server 110 can generate a tracking pixel and associate the tracking pixel with a unique identifier for the next recipient. At 218, a first possible cease processing operation is depicted which can correspond to the user of the bulk email client 106 detecting an inadvertent initiation of the bulk email.

At 222, the email marking and tracking server 110 can mark the unmarked email for the next recipient by adding the tracking pixel to the unmarked email. At 224, the marked email can be provided to the bulk email client 106. At 226, the bulk email client 106 can output a notification of that a marked (and individualized) email has been prepared for the next recipient. The method 200 include a second possible cease processing operation 230 that could be actuated for instance, if the user has a-priori knowledge that the (current) next recipient should not have been included in the list of the plurality of recipients. Additionally or alternatively, the user of the bulk email client 106 may desire to actuate the cease processing operation if the user sees that the marked email for next recipient has an error (e.g., a typographical error and/or formatting error). To ensure that the user is provided sufficient time to actuate the cease processing operation (if desired), the email marking and tracking server 110 can hold the marked email for a predetermined amount of time based on the parameters of request for the marked email (e.g., at 208).

Assuming that the cease processing operation has not been actuated, the sub-method continues, and at 232, the marked email for the next recipient of the bulk email is sent to the email client 104 (e.g., in an outbox). At 234, the email client 104 can forward the marked email for the next recipient to an email server 114 such as the email server 64 of FIG. 1.

Continuing with the sub-method, at 236 the email server 114 routes the marked email to a mailbox for the next recipient. At 237 the visual indicia overall status for the bulk email can be updated (e.g., the progress bar and/or the counter advanced). At 240, the method 200 can return to node A to prepare a marked (and individualized) email for a subsequent recipient of the bulk email. However, although a new iteration of the sub-method is initiated, the current iteration of the sub-method can continue. Thus, at some point in the future, at 250, the next recipient can employ an email recipient devices 116 (e.g., one of the K number of email recipient devices 66 of FIG. 1) to retrieve and open the marked email for the bulk email.

Upon opening the marked email, at 252, the email recipient device 212 can request the data at a URL included in the tracking pixel, which URL points to the email marking and tracking server 110. At 256, the email marking and tracking server sends the requested data for the email to the email recipient device 116. In response to the notification at 254, at 258 the email marking and tracking server 110 can register the marked email as having been opened by the next recipient.

In some examples, the marked email can include interactive features that allow the next recipient to generate a response to the marked email for the bulk email. In such examples at 260, the email recipient device 116 generates an email response that is provided at 262 to the email marking and tracking server 110.

The email marking and tracking server 110 can categorize the response to the marked email for the bulk email. Such categories can be positive, neutral and negative. For instance, a response corresponding to an "unsubscribe" option can be categorized as negative. Conversely, a response indicating that the next recipient perceived the marked email as being high quality can be categorized as positive. At 264, the email marking and tracking server 110 can provide a notification of the email response (including the category) to the bulk email client 106 via the bulk email API.

At 266, the bulk email client 106 can output information characterizing the email response (including the category) at the bulk email UI. At this point, as indicated by a third possible cease processing operation 268 the user of the bulk email client 106 may desire to actuate the cease processing operation in response to the notification. To provide the user time to process the information characterizing the email response, the bulk email client 106 may delay further operations for a predetermined amount of time based on the parameters of the bulk email.

Assuming that the cease processing operation has not been actuated the sub-method iteration completes and a next iteration is executed and a subsequent email is prepared for a subsequent recipient in the plurality of recipients. It is noted that multiple iterations of the sub-method can execute contemporaneously. As an example, for a wide distribution bulk email (e.g., 20 or more recipients) it is very unlikely that each recipient will open a corresponding marked email for the bulk email in the order in which the email was sent. Accordingly, as noted by operation 240 there is no need for the bulk email client 106 to wait on a notification of a response prior to preparing a subsequent email.

The method 200 illustrates that by employing the system 100, even after the process of sending the bulk email has been configured at 202, the user of the end-user device 102 can still actuate the cease processing operation (e.g., 218, 230 or 268 or elsewhere) to cease (pause or terminate) further processing of the bulk email prior to completion of such processing. Additionally, the bulk email client 106 and/or the email marking and tracking server 110 can add delay operations to ensure that the user of the end-user device 52 is given time to react to different operations of each iteration of the sub-method. In this manner, harm (e.g., harm to reputation, financial harm, etc.) that would be caused by completing the sending of the bulk email to every recipient in the plurality of recipients can be mitigated.

Figure 3:
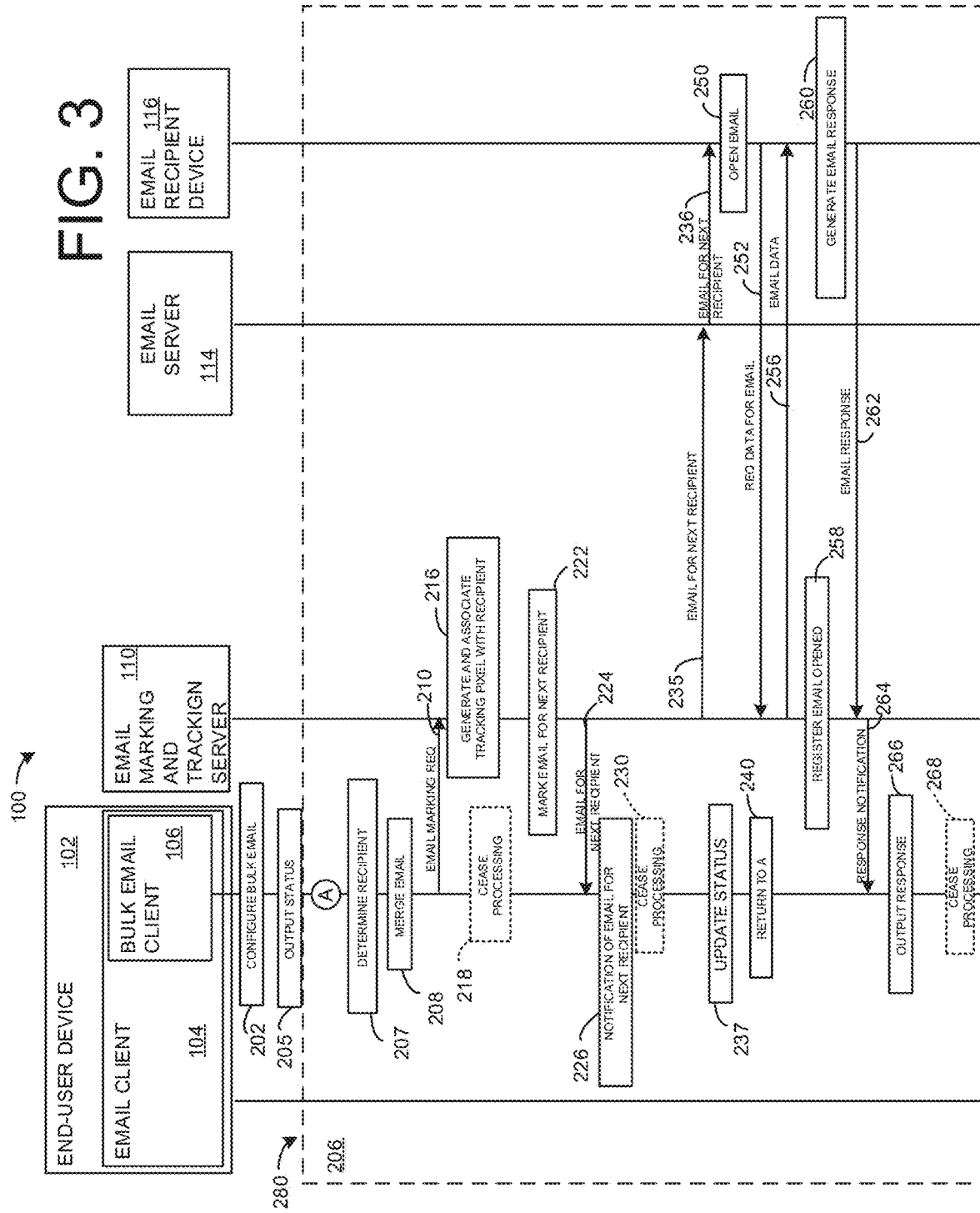
FIG. 3 illustrates another timing diagram of a system that generates and tracks processing of a bulk email.

FIG. 3 illustrates a timing diagram depicting another example of a timing of operations by the system 100 for executing a method 280 for processing a bulk email. For purposes of simplification of explanation, FIGS. 2 and 3 employ the same reference numbers to denote the same structure or operations. For purposes of simplification of explanation, operations common to FIGS. 2 and 3 are not repeated. The method 280 of FIG. 3 operates in a similar manner to the method 200 depicted in 200. However, in the method 280, operations 232 and 234 are omitted and replaced with operation 235, wherein the email marking and tracking server 110 provides the email server 114 the marked email for the next recipient directly. The benefits and of the execution of the method 280 in FIG. 3 are the same or nearly the same as the benefits to the execution of the method 200 of FIG. 2.

Figure 4:
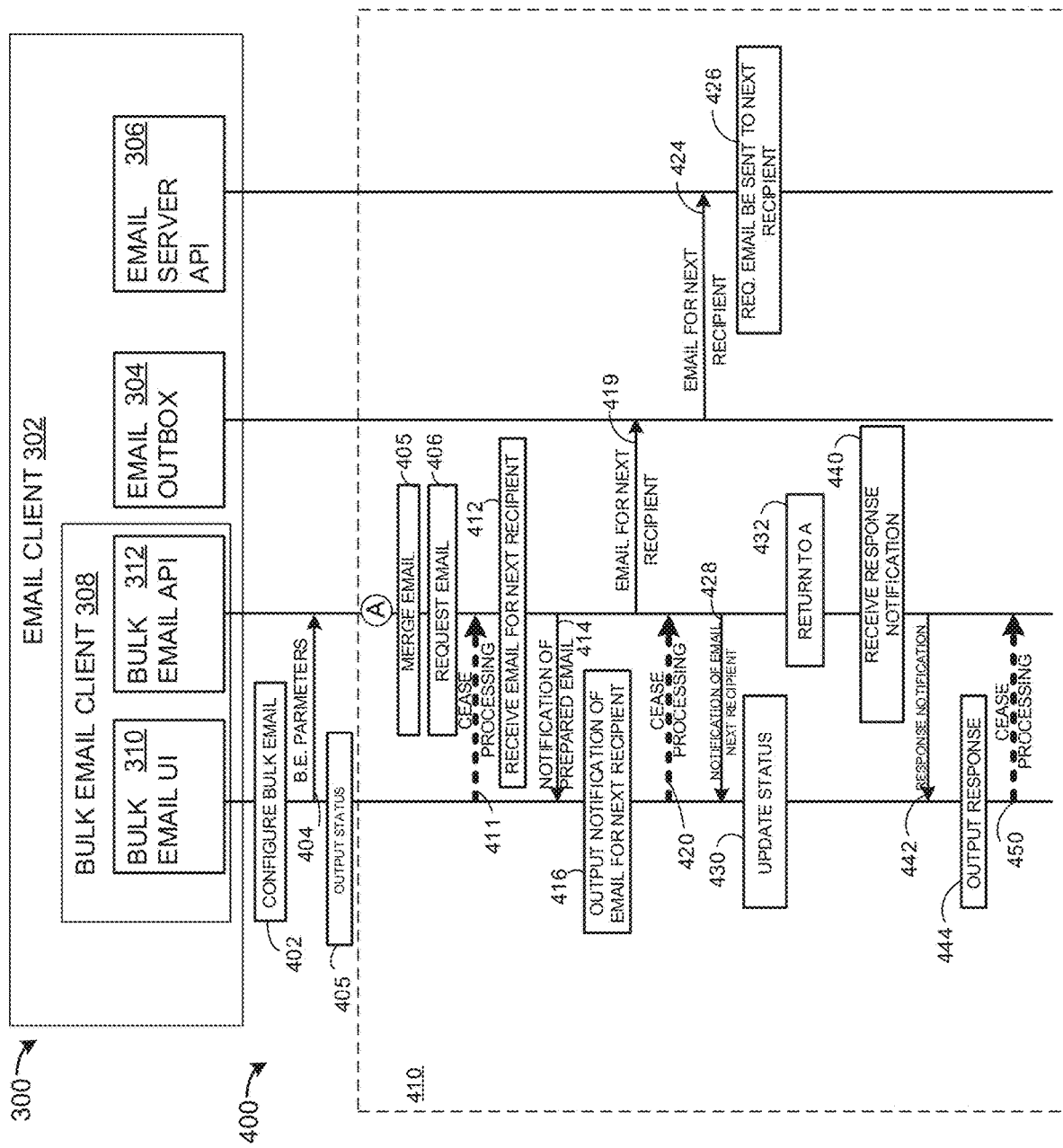
FIG. 4 illustrates a timing diagram of an end-user device that generates and tracks processing of a bulk email.

FIG. 4 illustrates a timing diagram depicting an example of a timing of operations by an end-user device 300 (e.g., a computing platform, such as the end-user device 52 of FIG. 1) for executing a method 400 for processing a bulk email. The end-user device 300 can execute an email client 302 (e.g., the email client 54 of FIG. 1). The email client 302 can include an email outbox 304 and an email server API 306. As explained herein, the email server API 306 can forward emails in the email outbox 304 to an email server (e.g., the email server 64 of FIG. 1) to facilitate the sending of emails to recipients. The bulk email client 308 can include a bulk email client 308 (e.g., the bulk email client 58 of FIG. 1) that operates as a plugin of the email client 302. The bulk email client 308 can control a bulk email UI 310 and a bulk email API 312. The bulk email API 312 can communicate with an email marking and tracking server (e.g., the email marking and tracking server 60 of FIG. 1) to process the bulk email.

At 402, a user of the bulk email UI 310 can configure the bulk email by setting parameters for the bulk email. Such parameters can include, but are not limited to any one or more of an initial email, a list of recipients of the bulk email, content for the bulk email, an amount of time between sending a first email and a second email in the bulk email and an amount of time between sending subsequent emails (after the second email) in the bulk email and/or intended receipt time or any combination thereof. Upon configuring the bulk email, at 404, the bulk email UI can send the bulk email parameters to the bulk email API 312. At 405, the bulk email UI 310 can output a visual indicia characterizing an overall status of the bulk email (e.g., a progress bar and/or a counter) to track the progress of the bulk email.

As indicated by node 'A', the bulk email can be processed and sent in an iterative sub-method (a sub-process) that is repeated (looped) for each recipient of the bulk email. Prior to execution of the sub-method, the bulk email client 308 can enable actuation of a cease processing operation the bulk email. A cease window 410 of the method 400 identifies the portion of the method 400 during which the bulk email can be ceased (canceled) after the processing of the bulk email has been initiated.

Throughout the cease window 410, "cease processing" operations (depicted with dashed line) are sent from the bulk email UI 310 to the bulk email API 312 to denote example times that the cease processing operation is actuated. The cease processing operation of the bulk email can be implemented, for example, as a cancellation or pause request. As one example, the cease processing operation can be actuated with pressing of a virtual button in the bulk email UI. At any point after the cease processing operation is enabled, the cease processing operation can be actuated. Actuation of the cease processing operation during processing of the bulk email causes the iteration of the sub-method (as well as other iterations of the sub-method executing in parallel) to pause or terminate prior to completion of the iteration of the sub-method. Actuation of the cease processing operation causes the bulk email client 308 to cease further operations that would otherwise continue the processing of the bulk email. As some examples, actuation of the cease processing operation can cause the bulk email API 312 to stop a next iteration from proceeding, cancel the current marking iteration, or even roll back the previous marking iteration as long as the email has not left the email outbox 304. The cease processing operation can be actuated in response to observations by the user to allow the bulk email to be processed in other than an all-or-nothing manner.

At 405, the bulk email API 312 can execute a mail merge operation to generate an unmarked mail for a next recipient of the bulk email based on the configuration of the bulk email. At 406, the bulk email API 312 generates a request for a marked email that is provided to the email marking and tracking sever, wherein the request includes the unmarked email. The method 400 includes a first possible cease processing operation 411 that could be actuated for instance, if the user determines that the bulk email was inadvertently activated.

During the sub-method, at 412 a marked (and individualized) email for a next email recipient can be received at the bulk email API 312. The marked email can have a tracking pixel that can uniquely identify the recipient. At 414, the bulk email API 312 can provide a notification to the bulk email UI 310 that the marked email has been prepared. At 416, the bulk email UI 310 can output a notification of the marked email has been prepared for the next recipient. Assuming that the cease processing operation has not been actuated, the sub-method continues, and at 419, the bulk email API 312 sends the marked email for the next recipient of the bulk email to the email outbox 304. The method 400 includes a second possible cease processing operation 420 that could be actuated for instance, if the user has a-priori knowledge that the (current) next recipient should not have been included in the list of the plurality of recipients. Additionally or alternatively, the user of the bulk email client 308 may desire to actuate the cease processing operation if the user sees that the marked email for next recipient has an error (e.g., a typographical error and/or formatting error). Actuation of the cease processing operation 420 rolls back the marked email from the email outbox 304 if the marked email has not left email outbox 304 at the time the cease processing operation 420 is actuated. Accordingly, actuation of the second cease processing operation 420 can result in the marked email for the next recipient of the bulk email being removed from the outbox 304. To ensure that the user is provided sufficient time to actuate the cease processing operation 420 (if desired), the bulk email API 312 can cause the email outbox 304 to hold the marked email for a predetermined amount of time based on the parameters of the bulk email.

Assuming that the cease processing operation has not been actuated, the sub-method continues, and at 424, the email outbox 304 can forward the marked email for the next recipient to an email server API 306. At 426, the email server API 306 can provide a request to the email server that the marked email be sent to the next recipient. At 428, the bulk email API 312 can provide a notification that the email to the next recipient has been sent to the bulk email UI 310.

At 430, the bulk email UI 310 elements that visually indicate the overall status for the bulk email can be updated (e.g., the progress bar and/or a counter advanced). At 432, the method 400 can return to node A to prepare a marked email for a subsequent recipient of the bulk email. However, although a new iteration of the sub-method is initiated, the current iteration of the sub-method can continue. Thus, at some point in the future, at 440, the bulk email API 312 can receive a notification of an email response (including category of the email response) from the email marking and tracking server.

At 442, the bulk email API 312 can forward the bulk email UI 310 the response notification characterizing the email response. At 444 the bulk email UI 310 can output information characterizing the email response (including the category). At this point, as indicated by a third possible cease processing operation 450 the user of the bulk email client 308 may desire to actuate the cease processing operation in response to the notification. To provide the user time to process the information characterizing the email response, the bulk email API 312 may delay further operations for a predetermined amount of time based on the parameters of the bulk email.

Assuming that the cease processing operation has not been actuated the sub-method iteration completes and a next iteration is executed and a subsequent email is prepared for a subsequent recipient in the plurality of recipients. It is noted that multiple iterations of the sub-method can execute contemporaneously. As an example, for a wide distribution bulk email (e.g., 20 or more recipients) it is very unlikely that each recipient will open a corresponding marked email for the bulk email in the order in which the email was sent. Accordingly, as noted by operation 432 there is no need for the bulk email API 312 to wait on a receipt of a notification (at 442) that a given recipient has provided a response prior to sending a subsequent email.

The method 400 illustrates that by employing the bulk email client 308, even after the process of sending the bulk email has been initiated at 404, the user of the bulk email client 308 can still actuate the cease processing operation (e.g., 411, 420 or 450 or elsewhere) to pause or terminate further processing of the bulk email prior to completion of such processing. Additionally, the bulk email API 312 can add delay operations to ensure that the user of the end-user device 300 is given time to react to different operations of each iteration of the sub-method. In this manner, harm (e.g., harm to reputation, financial harm, etc.) that would be caused by completing the sending of the bulk email to every recipient in the plurality of recipients can be mitigated.

Figure 5:
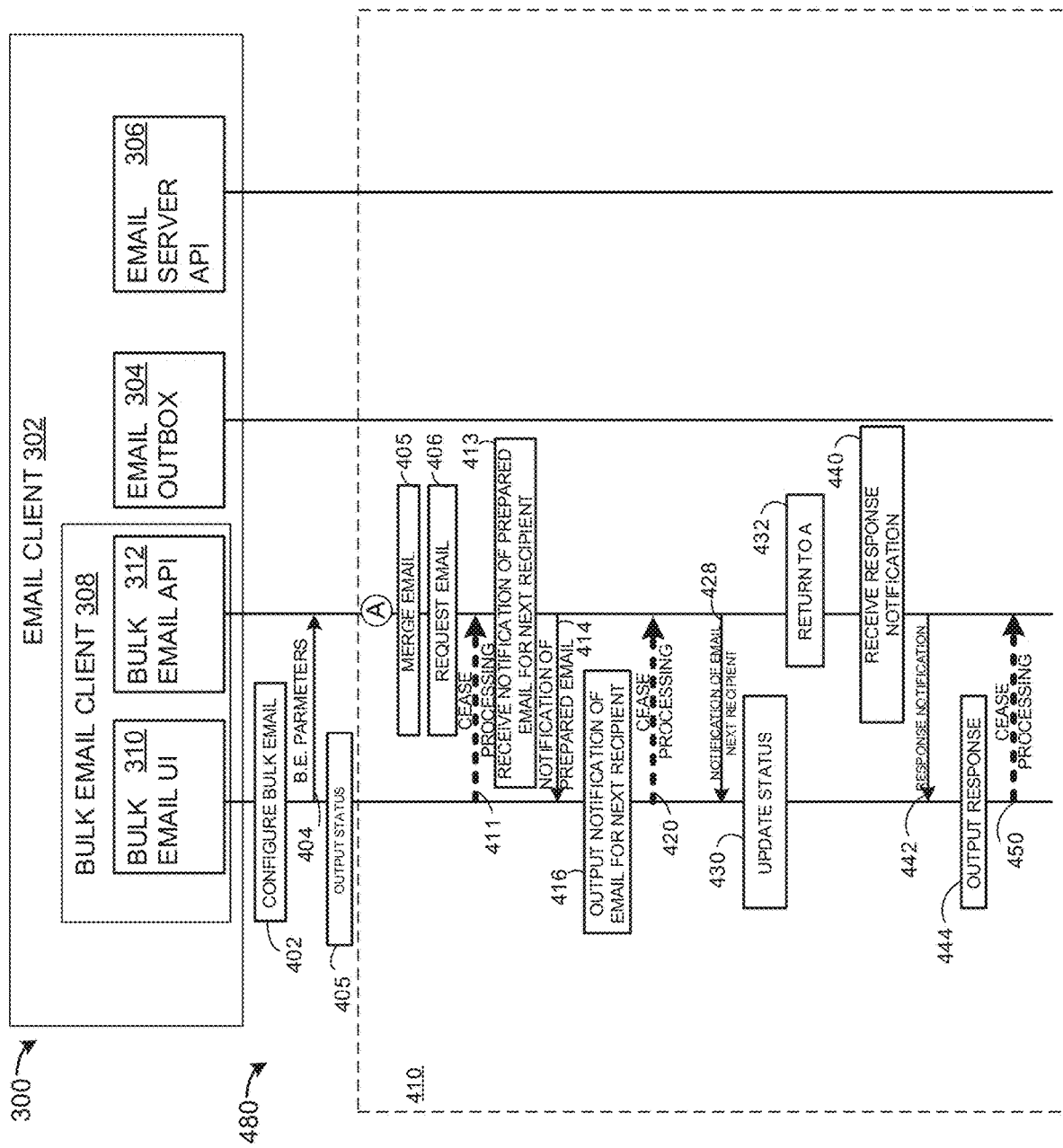
FIG. 5 illustrates another timing diagram of an end-user device that generates and tracks processing of a bulk email.

FIG. 5 illustrates a timing diagram depicting another example of a timing of operations by the end-user device 300 for executing a method 480 for processing a bulk email. For purposes of simplification of explanation, FIGS. 4 and 5 employ the same reference numbers to denote the same structure or operations. For purposes of simplification of explanation, operations common to FIGS. 4 and 5 are not repeated. The method 480 of FIG. 5 operates in a similar manner to the method 400 depicted in FIG. 4. However, in the method 480, operations 412, 419, 424 and 426 are omitted and replaced with operation 413, wherein the bulk email API 312 receives a notification that an marked email has been prepared for the next recipient, thereby indicating that the email marking and tracking server is providing the email server the marked (and individualized) email for the next recipient directly to the email server. The benefits and of the execution of the method 480 in FIG. 5 are the same or nearly the same as the benefits to the execution of the method 400 of FIG. 4.

Figure 6:
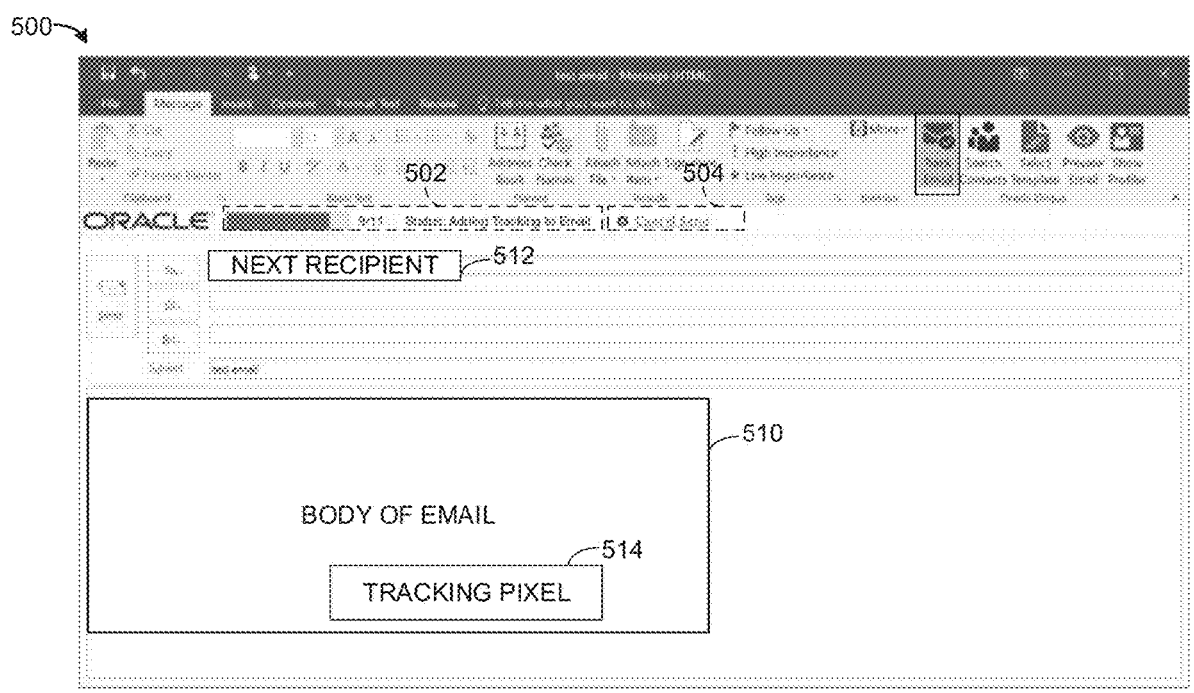
FIG. 6 illustrates a screenshot of a marked email generated for a bulk email.

FIG. 6 illustrates an example screenshot 500 that could be output by a bulk email UI of a bulk email client (e.g., the bulk email client 58 of FIG. 1) in response to receipt of a marked email for a recipient of a bulk email. The screenshot 500 depicts an email window that includes visual indicia 502 in the form of a progress bar and a counter to illustrate an overall progress of the bulk email. Additionally, the screenshot 500 includes a virtual button 504 (labeled "CANCEL SEND") that (if actuated) actuates a cease processing operation.

Further, the screenshot 500 includes a body of the marked email 510. The body of the marked email 510 includes the content of the email in the form that is to be viewed by a particular recipient, namely, the next recipient included in the TO field of the marked email as indicated at 512. Further, the body of the marked email 510 includes a tracking pixel 514 embedded therein to allow a determination of when the next recipient opens the marked email for the bulk email, in a manner described herein.

Figure 7:
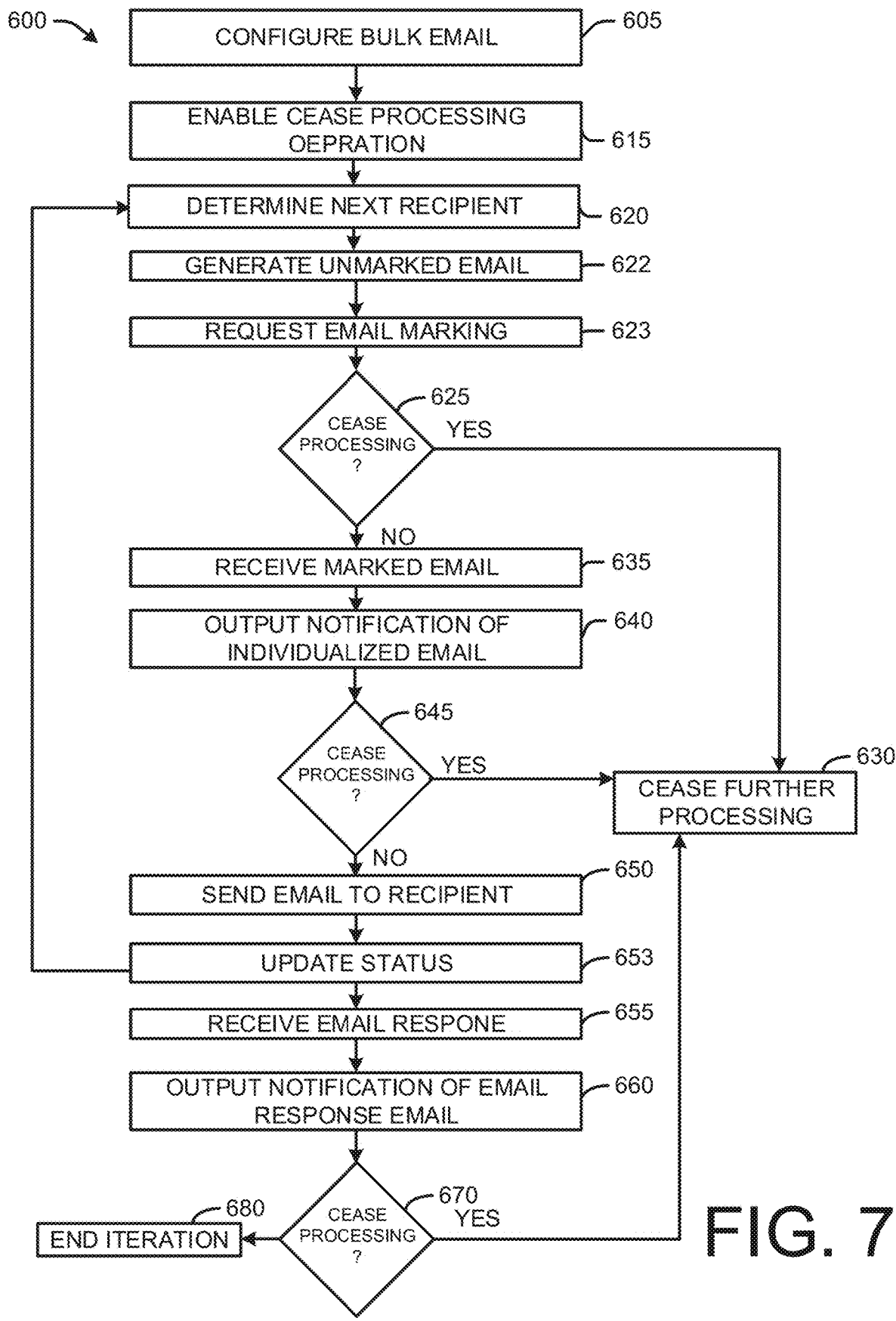
FIG. 7 illustrates a flowchart of an example method for generating and tracking processing of a bulk email.
Figure 8:
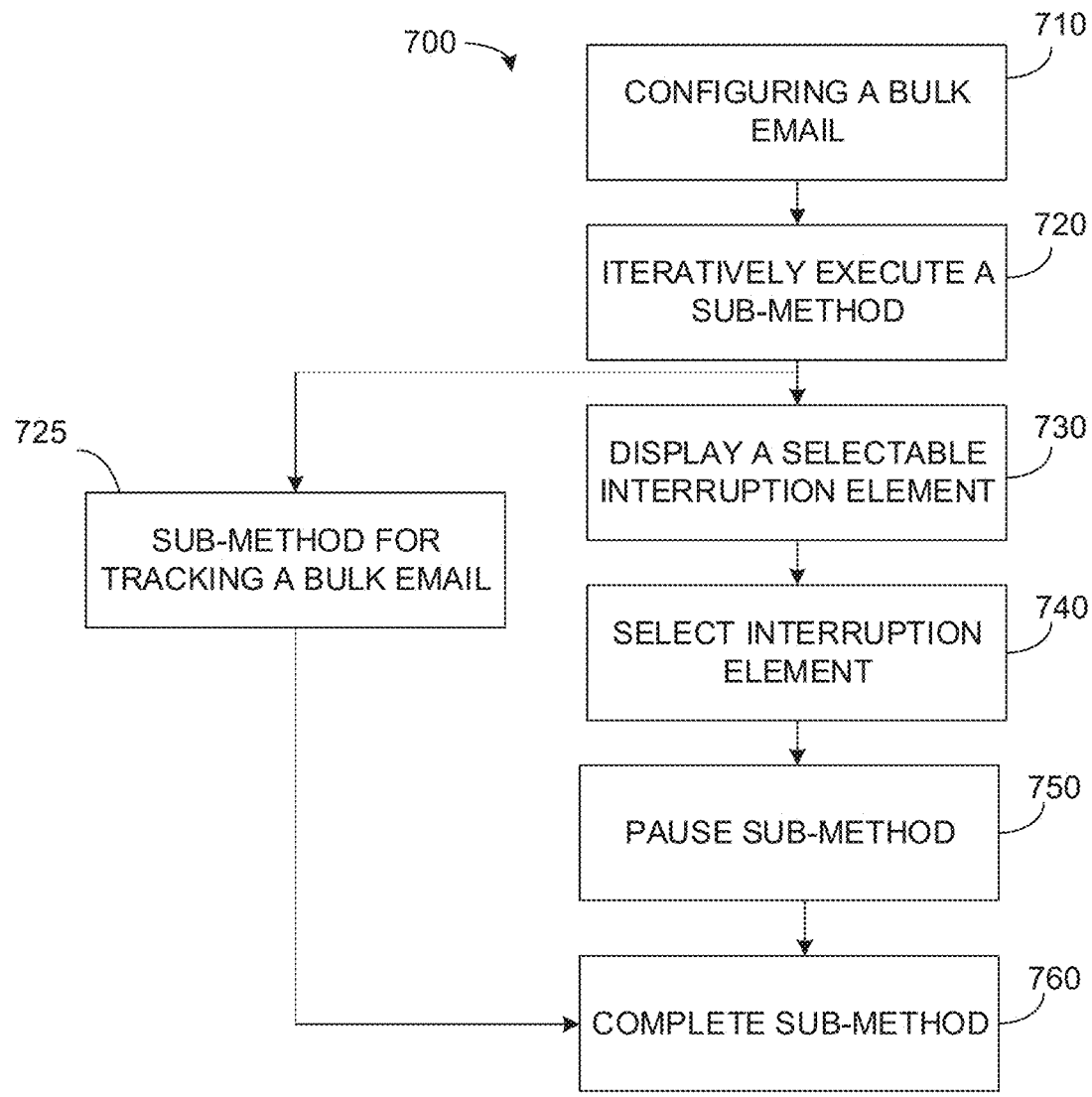
FIG. 8 illustrates another flowchart of another example method for generating and tracking processing of a bulk email.
Figure 9:
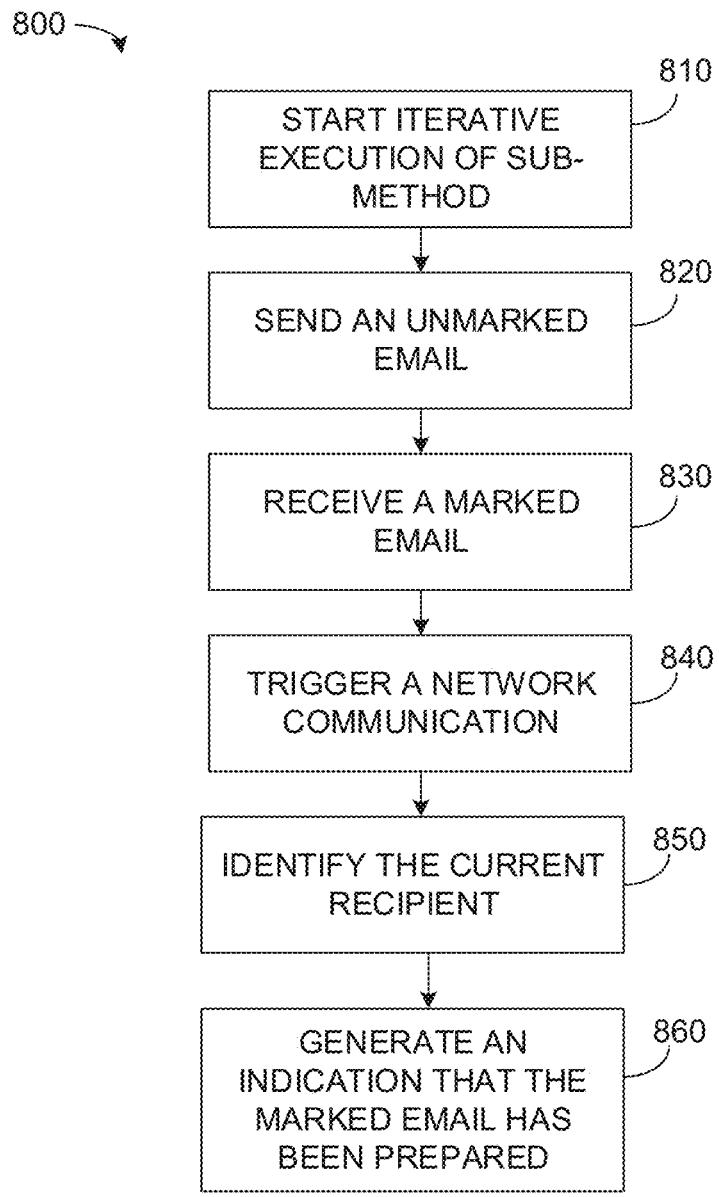
FIG. 9 illustrates another flowchart of an example sub-method for generating and tracking processing of a bulk email.

In view of the foregoing structural and functional features described above, example methods will be better appreciated with reference to FIGS. 7-9. While, for purposes of simplicity of explanation, the example methods of FIGS. 7-9 are shown and described as executing serially and in parallel, it is to be understood and appreciated that the present examples are not limited by the illustrated order, as some actions could in other examples occur in different orders, multiple times and/or concurrently from that shown and described herein. Moreover, it is not necessary that all described actions be performed to implement a method. The example methods of FIGS. 7-9 can be implemented as instructions stored in a non-transitory machine-readable medium. The instructions can be accessed by a processing resource (e.g., one or more processor cores) and executed to perform the methods disclosed herein.

FIG. 7 illustrates a flowchart of an example method 600 for processing a bulk email that can be tracked and paused or canceled. The method 600 can be implemented, for example, by the system 50 of FIG. 1.

At 605, a bulk email client (e.g., the bulk email client 58 of FIG. 1) can configure a bulk email. Such configuration can include, for example, setting parameters of the bulk email, which parameters include (at least) an initial email and a list of the recipients of the bulk email. At 615, the bulk email client enables actuation of a cease processing operation.

At 620, an iteration of a sub-method is initiated and the bulk email client determines a next recipient of the bulk email. At 622, the bulk email client generates an unmarked (individualized) email for the next recipient (e.g., a merge email operation). At 623, the bulk email sends the unmarked email in a request for an email marking to an email marking and tracking server (e.g., the email marking and tracking server 60 of FIG. 1). At 625, a determination can be made as to whether the cease processing operation has been actuated. If the determination at 625 is positive (e.g., YES), the method 600 proceeds to 630. If the determination at 625 is negative (e.g., NO), the method 600 proceeds to 635.

At 630, actuation of the cease processing operation causes the bulk email client and the email marking and tracking server to cease (e.g., terminate or pause) further processing of the bulk email. Moreover, in situations where multiple iterations of the sub-method are executing in parallel, each such iteration can be ceased. In fact, in some examples, actuation of the cease processing operation can cause the could stop the next iteration from proceeding, cancel the current marking iteration and/or even roll back the previous marking iteration as long as the email has not left an outbox of an email client.

At 635, a marked email is returned by the email marking and tracking server for the next recipient. The marked email can include a tracking pixel. At 640, the bulk email client can output a notification of the marked email. Such a notification can be implemented in a manner similar to the screenshot 500 of FIG. 6. At 645, another determination can be made as to whether the cease processing operation has been actuated. If the determination at 645 is positive (e.g., YES), the method 600 proceeds to 630. If the determination at 645 is negative (e.g., NO), the method 600 proceeds to 650.

At 650, the marked email prepared for the next recipient is sent to the next recipient from an email sever. In some examples, the marked email is sent to the email server by an email client (e.g., the email client 54 of FIG. 1). In other examples, the marked email is sent email marking and tracking server to the email server. At 653, visual indicia (e.g., a progress bar and/or a counter) characterizing a status of the overall progress of the bulk email is updated by the bulk email client. Moreover, at 653, the method 600 returns to 620 to initiate another sub-method iteration for a subsequent recipient. However, contemporaneously, the current sub-method can continue to proceed to 655.

At 655, a response to the marked email (e.g., an email response) can be received by the email marking and tracking server. At 660 the bulk email client can output a notification characterizing the response to the marked email for the bulk email. At 670, yet another determination can be made as to whether the cease processing operation has been actuated. If the determination at 670 is positive (e.g., YES), the method 600 proceeds to 630. If the determination at 670 is negative (e.g., NO), the method 600 proceeds to 680. At 680, the iteration of the sub-method ends.

Specific details are given in the above description to provide a thorough understanding of the described examples. However, it is understood that the examples can be practiced without these specific details. For example, physical components can be shown in block diagrams in order not to obscure the embodiments in unnecessary detail. In other instances, well-known circuits, processes, algorithms, structures, and techniques can be shown without unnecessary detail in order to avoid obscuring the embodiments.

FIG. 8 illustrates another flowchart of another example method 700 for tracking a bulk email. At 710, bulk email is configured by a bulk email client operating on computing platform. At 720, the bulk email client begins to iteratively execute a sub-method 725 for tracking a bulk email that is described in detail with respect to FIG. 9. Concurrently with execution of the sub-method at 725, at 730, the bulk email client displays a graphical user interface that shows a selectable interruption element. Accordingly, at 740, a user selects the interruption element. In response to selection of the interruption element, the sub-method pauses at 750, prior to the completion of current or next iteration of the sub-method. While the sub-method is paused, the user has time to decide an appropriate course of action, such as terminating the sub-method or letting the sub-method continue. At 760, in response to the user not requesting to cease continuation, the sub-method is completed when a marked email corresponding to the bulk email is prepared for each recipient in the plurality of recipients.

FIG. 9 illustrates another flowchart of an example sub-method 800 for tracking a bulking email. The sub-method 800 is employable to implement the sub-method 725 of FIG. 8. At 810, the bulk email begins to iteratively execute the sub-method. The sub-method includes, at 820, sending an unmarked email to an email marking server. The unmarked email is based on a copy of an initial email and a current recipient of the plurality of recipients configured by the bulk email client. At 830, a marked email is received at the bulk email client. The marked email is tied to a specific record on the email marking server that uniquely identifies the current recipient, via an identifier.

At 840, the marking triggers a network communication to the email marking server when the current recipient interacts with the email. The email marking server is configured to identify the current recipient as having interacted with the marked email when the marking triggers the network communication to the marking server. Additionally, the email marking server is configured to identify, at 850, the current recipient as having interacted with the marked email when the marking triggers the network communication to the marking server. Accordingly, at 860, the bulk email client generates a graphical indication in the graphical user interface that the marked email has been prepared, such that the marking includes a tracking pixel.

Figure 10:
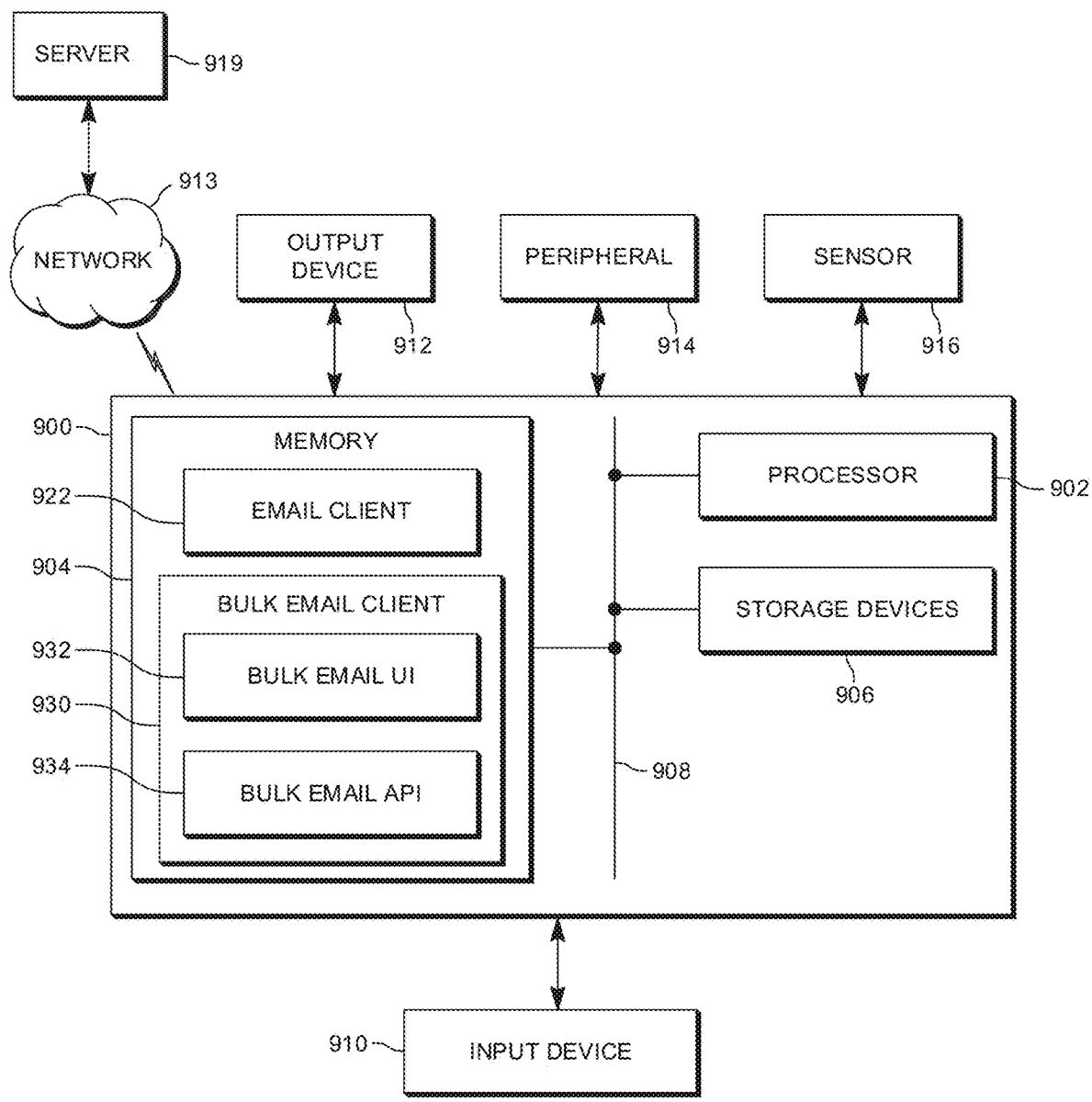
FIG. 10 illustrates an example of a computing system employable to generate and track processing of a bulk email.

The examples herein may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory and input and output device(s) to perform one or more embodiments. As shown in FIG. 10, the computing system 900 can include a computer processor 902, associated memory 904 (e.g., random access memory (RAM), cache memory, flash memory, etc.), one or more storage devices 906 (e.g., a solid state drive, a hard disk drive, an optical drive such as a compact disk (CD) drive or digital versatile disk (DVD) drive, a flash memory stick, etc.) and numerous other elements and functionalities. The computer processor 902 may be an integrated circuit for processing instructions. For example, the computer processor may be one or more cores, or micro-cores of a processor. Components of the computing system 900 can communicate over a data bus 908.

The computing system 900 may also include an input device 910, such as any combination of one or more of a touchscreen, keyboard, mouse, microphone, touchpad, electronic pen, or any other input device. Further, the computing system 900 can include an output device 912, such as one or more of a screen (e.g., light emitting diode (LED) display, an organic light emitting diode (OLED) display, a liquid crystal display (LCD), a plasma display, touchscreen, cathode ray tube (CRT) monitor, projector, or other display device), a printer, external storage, or any other output device. In some examples, such as a touch screen, the output device 912 can be the same physical device as the input device 910. In other examples, the output device 912 and the input device 910 can be implemented as separate physical devices. The computing system 900 can be connected to a network 913 (e.g., a local area network (LAN), a wide area network (WAN) such as the Internet, mobile network, or any other type of network) via a network interface connection (not shown). The input device 910 and output device(s) 912 can be connected locally and/or remotely (e.g., via the network 913) to the computer processor 902, the memory 904 and/or the storage device 906. Many different types of computing systems exist, and the aforementioned input device 910 and the output device 912 can take other forms. The computing system 900 can further include a peripheral 914 and a sensor 916 for interacting with the environment of the computing system 900 in a manner described herein.

Software instructions in the form of computer readable program code to perform embodiments disclosed herein can be stored, in whole or in part, temporarily or permanently, on a non-transitory computer readable medium such as a CD, DVD, storage device, a diskette, a tape, flash memory, physical memory, or any other computer readable storage medium. Specifically, the software instructions can correspond to computer readable program code that when executed by a processor, is configured to perform operations disclosed herein. The computing system 900 can communicate with a server 919 via the network 913.

The memory 904 can include email client 922 that can be implemented as a software application (e.g., an "app") for generating and reading emails that are transmitted over a network. The memory 904 can also include a bulk email client 930 that is a plugin of the email client 922. The bulk email client 930 includes a bulk email UI 932 that can be a graphical user interface (GUI) that is integrated with a UI of the email client 922. The bulk email client 930 can further include a bulk email API 934 that can provide a notification that the email to the next recipient has been sent to the bulk email UI 932.

Further, one or more elements of the aforementioned computing system 900 can be located at a remote location and connected to the other elements over a network 913. Further, some examples can be implemented on a distributed system having a plurality of nodes, where each portion of an embodiment can be located on a different node within the distributed system. In one example, the node corresponds to a distinct computing device. Alternatively, the node can correspond to a computer processor with associated physical memory. The node can alternatively correspond to a computer processor or micro-core of a computer processor with shared memory and/or resources.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof. In one example, email marking and tracking server 60 and/or the email server 64 of FIG. 1 can be implemented on one or more cloud servers and can be configured to receive feature sets for analysis from one or more client systems. Specifically, email marking and tracking server 60 and/or the email server 64 can be implemented on a multi-tenant cloud services platform system such that multiple clients can log in to a central location to access a server or collection of servers, but where the specific access to data. For example, each client might be restricted from accessing data of other clients, and the multi-tenant cloud services platform system may keep track of how many resources (e.g., processor cycles, storage, or time spent using instances of cloud-hosted software applications) have been used by each of the clients, and bill the clients based on the resource usage.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" can represent one or more memories for storing data, including read only memory (ROM), random RAM, magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a LAN and a WAN, e.g., the Internet.

The computing system can include clients and servers. A client and server are generally remote from each other and typically interact through a communication network. The relationship of client and server arises by virtue of computer programs running on the respective computers and having a client-server relationship to each other.

In view of the foregoing structural and functional description, those skilled in the art will appreciate that portions of the systems and method disclosed herein may be embodied as a method, data processing system, or computer program product such as a non-transitory computer readable medium. Accordingly, these portions of the approach disclosed herein may take the form of an entirely hardware embodiment, an entirely software embodiment (e.g., in a non-transitory machine readable medium), or an embodiment combining software and hardware. Furthermore, portions of the systems and method disclosed herein may be a computer program product on a computer-usable storage medium having computer readable program code on the medium. Any suitable computer-readable medium may be utilized including, but not limited to, static and dynamic storage devices, hard disks, solid-state storage devices, optical storage devices, and magnetic storage devices.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A method for tracking bulk email comprising:
   configuring, by a bulk email client executing on a computing platform, a bulk email, wherein the bulk email includes an initial email and identifies a plurality of recipients; and
   iteratively executing by the bulk email client after the configuring, a sub-method until either a marked email corresponding to the bulk email is prepared for each recipient in the plurality of recipients or a request to cease continuation of processing the bulk email is generated in response to user input at the bulk email client, wherein the bulk email client displays a graphical user interface that shows a selectable interruption element that, if selected, terminates or pauses prior to completion of a current or next iteration of the sub-method in response to the selection, the sub-method comprising:
      sending, from the bulk email client, an unmarked email to an email marking server, wherein the unmarked email is based on a copy of the initial email and a current recipient of a plurality of recipients;
      receiving, at the bulk email client, a marked email from the email marking server, wherein the marked email comprises a marking, wherein the marking is tied to a specific record on the email marking server that uniquely identifies the current recipient, via an identifier, and the marking triggers a network communication to the email marking server when the current recipient interacts with the marked email, such that the email marking server is configured to identify the current recipient as having interacted with the marked email when the marking triggers the network communication to the marking server; and generating, at the bulk email client, a graphical indication in the graphical user interface that the marked email has been prepared, wherein the marking comprises a tracking pixel, wherein the sub-method is paused prior to completion of a given iteration in response to user input at the bulk email client causing selection of the selectable interruption element at the bulk email client, such that a user of the bulk email client is provided with a time delay to determine whether to terminate the sub-method or continue the given iteration of the sub-method.

2. The method of claim 1, wherein the bulk email client is a plugin of an email client, the method further comprising:

holding the marked email for the current recipient a predetermined amount of time; and sending, by the bulk email client after the holding, the marked email to an outbox of the email client.

3. The method claim 1, wherein the sub-method further comprises:

selecting, at the bulk email client, the current recipient from the plurality of recipients based on a predicted location of the current recipient and a current time.

4. The method of claim 1, wherein sub-method further comprises:

receiving, at the bulk email API, a notification categorizing a response to the marked email; and outputting, at the bulk email UI, information corresponding to the category of the response to the marked email.

5. The method of claim 1, the selectable interruption element is selected in response to a negative categorization of the response to the marked email.

6. The method of claim 1, the selectable interruption element is selected after at least one execution of the sub-method and prior to each of the plurality of recipients being prepared a marked email.

7. The method of claim 1, further comprising:

preparing a first subset of the plurality of recipients an individualized email based on a first content;

and preparing a second subset of the plurality of recipients an individualized email based on a second content.

8. The method of claim 1, whereby the iterative executing is terminated or paused prior to completion of a current iteration of the sub-method in response to the request to cease continuation of processing the bulk email.

9. The method of claim 1, wherein an account associated with the bulk email client is debited a given fee for marking a plurality of marked emails, wherein the given fee is less than a fee for marking an email for each of the plurality of recipients.

10. A method for tracking bulk email comprising:

configuring, by a bulk email user interface (UI), parameters of a bulk email, wherein the parameters includes an initial email and a plurality of recipients;

enabling, at a bulk email UI, actuation of a request to cease continuation of processing the bulk email; and iteratively executing, by the bulk email client after the configuring, a sub-method until either each recipient of the plurality of recipients is prepared a marked email corresponding to the bulk email or a request to cease continuation of processing the bulk email is generated in response to user input at the bulk email UI, wherein the bulk email UI displays a selectable interruption element that, if selected, terminates or pauses prior to completion of a current or next iteration of the sub-method in response to the selection, the sub-method comprising:

sending, from the bulk email API, an unmarked email to the email marking server, wherein the unmarked email is based on a copy of the initial email and a current recipient of a plurality of recipients;

receiving, at the bulk email API, a marked email from the email marking server, wherein the marked email comprises a marking, wherein the marking is tied to a specific record on the email marking server that uniquely identifies the current recipient, via an identifier, and the marking triggers a network communication to the email marking server when the current recipient interacts with the marked email, such that the email marking server is configured to identify the current recipient as having interacted with the marked email when the marking triggers the network communication to the marking server; and outputting, at the bulk email UI, a graphical indication that the marked email has been prepared, wherein the marking comprises a tracking pixel, wherein the sub-method is paused prior to completion of a given iteration in response to user input at the bulk email client causing selection of the selectable interruption element at the bulk email client, such that a user of the bulk email client is provided with a time delay to determine whether to terminate the sub-method or continue the given iteration of the sub-method.

11. The method of claim 10, wherein the sub-method further comprises:

holding, at the bulk email API, the marked email for the current recipient a predetermined amount of time;

providing, at the bulk email API, the marked email for the current recipient to an outbox of an email client after the holding; and updating, in response to the providing, a status of the bulk email at the bulk email UI.

12. The method of claim 10, wherein the sub-method further comprises:

receiving, at the bulk email API, a notification categorizing a response to the marked email; and outputting, at the bulk email UI, information corresponding to the category of the response to the marked email.

13. The method of claim 12, wherein the selectable interruption element is selected in response to the category of the response to the marked email being negative, such that less than every recipient of the plurality of recipients is sent a marked email corresponding to the bulk email.

14. The method of claim 10, wherein termination or pausing further comprises:

stopping a next iteration of the sub-method from processing;

cancelling a current iteration of the sub-method; and rolling back a previous iteration in response to determining that an email generated in the previous iteration has not left an email client outbox.

15. A non-transitory computer readable medium storing a computer readable program that causes the program to:

configure, by a bulk email client, a bulk email, wherein the bulk email includes an initial email and identifies a plurality of recipients; and iteratively execute by the bulk email client after the configuration, a sub-method until either a marked email corresponding to the bulk email is prepared for each recipient in the plurality of recipients or a request to cease continuation of processing the bulk email is generated in response to user input at the bulk email client, wherein the bulk email client displays a graphical user interface that shows a selectable interruption element that, if selected, terminates or pauses prior to completion of a current or next iteration of the sub-method in response to the selection, the sub-method comprising:

sending, from the bulk email client, an unmarked email to an email marking server, wherein the unmarked email is based on a copy of the initial email and a current recipient of a plurality of recipients;

receiving, at the bulk email client, a marked email from the email marking server, wherein the marked email comprises a marking, wherein the marking is tied to a specific record on the email marking server that uniquely identifies the current recipient, via an identifier, and the marking triggers a network communication to the email marking server when the current recipient interacts with the marked email, such that the email marking server is configured to identify the current recipient as having interacted with the marked email when the marking triggers the network communication to the marking server; and generating, at the bulk email client, a graphical indication in the graphical user interface that the marked email has been prepared, wherein the marking comprises a tracking pixel, wherein the sub-method is paused prior to completion of a given iteration in response to user input at the bulk email client causing selection of the selectable interruption element at the bulk email client, such that a user of the bulk email client is provided with a time delay to determine whether to terminate the sub-method or continue the given iteration of the sub-method.

16. The non-transitory computer readable medium of claim 15, further comprising:

selecting, at the bulk email client, the current recipient from the plurality of recipients based on a predicted location of the current recipient and a current time.

17. The non-transitory computer readable medium of claim 15, wherein an account associated with the bulk email client is debited a given fee for marking a plurality of marked emails, wherein the given fee is less than a fee for marking an email for each of the plurality of recipients.

18. The non-transitory computer readable medium of claim 15, wherein the selectable interruption element is selected after at least one execution of the sub-method and prior to each of the plurality of recipients being prepared a marked email.

19. The non-transitory computer readable medium of claim 15, wherein actuation of the request to cease continuation of processing the bulk email further comprises:

stopping a next iteration of the sub-method from processing;

cancelling a current iteration of the sub-method; and rolling back a previous iteration if an email generated in the previous iteration has not left an email client outbox.

20. The non-transitory computer readable medium of claim 19, wherein the email client comprises the bulk email client executing as a plugin of the email client.

* * * * *

UNITED STATES PATENT AND TRADEMARK OFFICE
CERTIFICATE OF CORRECTION

Page 1 of 1

PATENT NO.        : 10,938,770 B2
APPLICATION NO.   : 16/560387
DATED             : March 2, 2021
INVENTOR(S)       : Chuhadar et al.

It is certified that error appears in the above-identified patent and that said Letters Patent is hereby corrected as shown below:

In the Specification

In Column 1, Line 8, delete "2019," and insert -- 2018, --, therefor.

In Column 8, Line 52, delete "prepare" and insert -- prepared --, therefor.

In the Claims

In Column 21, Line 21, in Claim 3, after "method" insert -- of --.

Signed and Sealed this
Twenty-ninth Day of June, 2021

Drew Hirshfeld
*Performing the Functions and Duties of the*
*Under Secretary of Commerce for Intellectual Property and*
*Director of the United States Patent and Trademark Office*